(No Model.)
F. P. MALONE.
SLIDE VALVE FOR STEAM ENGINES.
No. 521,592. Patented June 19, 1894.
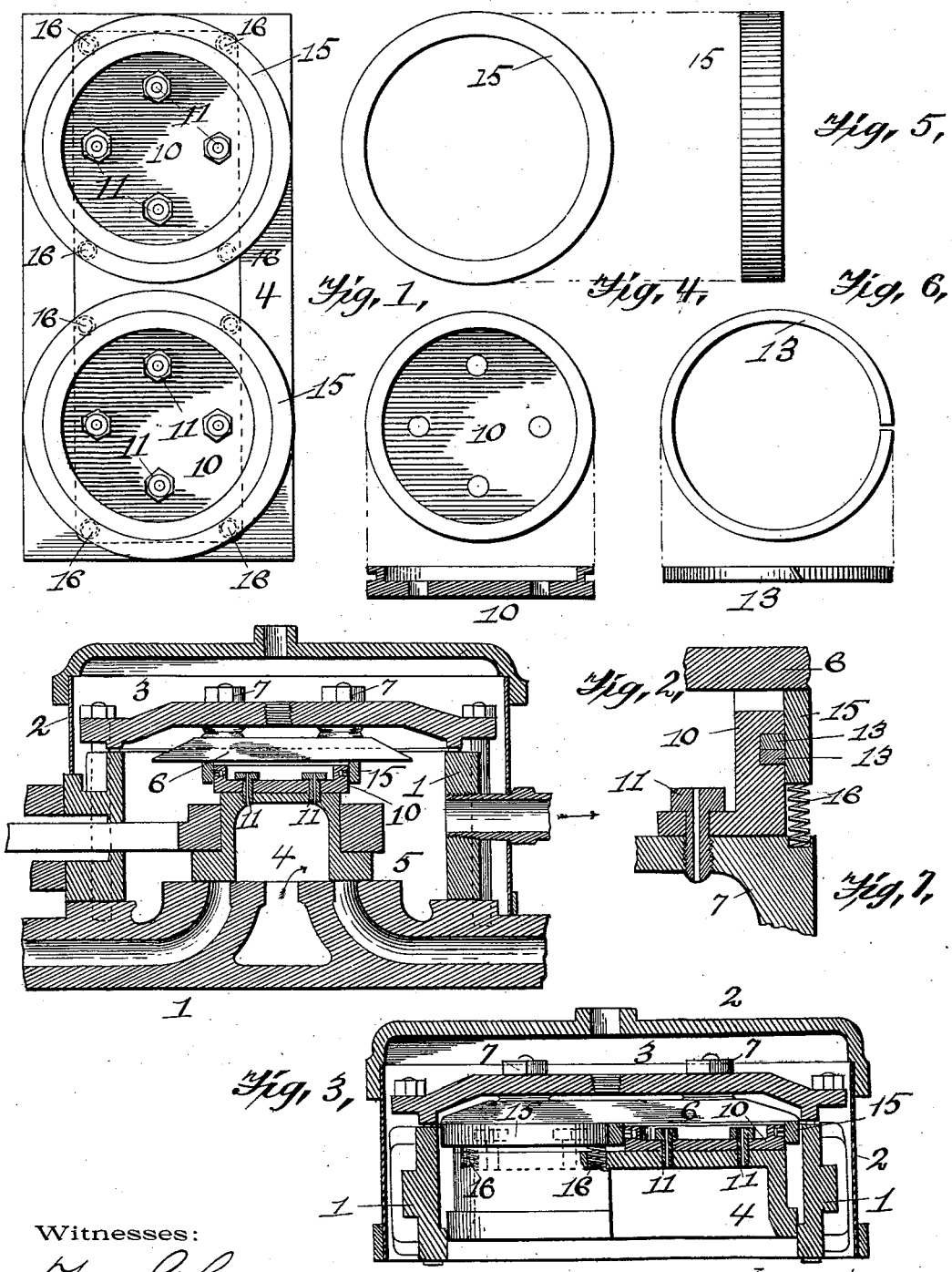
Witnesses:
D. W. Johnson,
C. K. Davies.
Inventor
Frank P. Malone
By W. H. Bartlett,
Attorney.

United States Patent Office.

FRANK P. MALONE, OF EVANSTON, WYOMING, ASSIGNOR OF ONE-HALF TO JOHN CARRICK, OF SAME PLACE.

SLIDE-VALVE FOR STEAM-ENGINES.

SPECIFICATION forming part of Letters Patent No. 521,592, dated June 19, 1894.

Application filed January 26, 1894. Serial No. 498,106. (No model.)

*To all whom it may concern:*

Be it known that I, FRANK P. MALONE, residing at Evanston, in the county of Uinta and State of Wyoming, have invented certain new and useful Improvements in Slide-Valves for Steam-Engines, of which the following is a specification, reference being had therein to the accompanying drawings.

This invention relates to slide valves for steam engines.

The object of the invention is to provide an improved balance ring and packing joint whereby contact between the surfaces of the balance ring and valve body will be maintained steam tight, and the contact of the balancing ring with the cover of the steam chest will also be steam tight; also to improve the construction of the slide valve and balance ring.

Figure 1 is a plan of the valve and its packing rings. Fig. 2 is a transverse section through the steam chest and packing rings, showing parts in elevation. Fig. 3 is a section, and partial elevation, at right angles to the section Fig. 2, parts being omitted. Fig. 4 is a plan and section of the bull ring. Fig. 5 is a plan and elevation of the balance ring. Fig. 6 is a plan and elevation of one of the packing rings; and Fig. 7, an enlarged sectional detail.

The numeral 1 indicates the steam chest, and 2 the casing thereof. These are of a common construction. So much only of the steam chest and casing are shown as are necessary to give an understanding of the invention. The cap or cover 3 of the steam chest is held down by bolts, or in other suitable and usual way. The valve 4 has its seat on the floor 5, and bears against the plate 6, which plate may be adjusted to parallelism with the valve seat, or to take up wear, by means of set screws or bolts 7 which pass through the cover of the steam chest. As shown in Figs. 1 and 3, the valve has two bull rings, 10, attached to its upper surface, by screw bolts 11, which bolts have longitudinal passages for steam. The number of rings, however, may be proportioned to the size of the valve. Each bull ring is in the form of a cup, with holes in the bottom for the passage of the retaining bolts 11. In the upturned outer flange of the bull ring there is a groove 12, in which groove two or more spring packing rings 13 are inclosed. Outside the flange of the bull ring, and inclosing the packing rings I place the balance ring 15. The spring rings 13 close tightly against this packing ring, and form a steam tight joint between the packing ring and the bull ring. The balance ring is held up against the plate 6 by a number of spiral springs 16, which springs bear on the valve, and on the lower edge of the packing ring outside the bull ring. The balance ring is thus held up to its seat against the plate 6, but will yield slightly to compensate for wear, or for the lack of parallelism between the valve seat and the plate 6, or for irregularities in the valve itself. The course of the steam in the ports is as usual. The steam from below the valve passes through bolts 11 to the inside of the bull ring and balance ring, but is prevented from escaping by the tight packing rings. The area inside the balance rings should equal the pressure area below the valve, in order that the valve be balanced.

What I claim is—

1. In a valve of the character described, the seat and the wear plate adjustable relatively to said seat, and the interposed slide having a cup-shaped bull-ring attached to the upper surface of the slide by perforated bolts passing through the bottom of the cup and the top of the slide, thus affording passage for steam, the balance-ring surrounding the bull-ring and held against the wear plate by springs arranged directly under the balance ring, and the interposed packing between the bull-ring and the balance-ring, all combined substantially as described.

2. In a valve of the character described, the seat and wear plate adjustable thereto, the interposed slide having a plurality of cup-shaped bull rings attached by perforated bolts to afford steam passage as described, a balance ring surrounding each bull ring, and springs directly under the balance ring, and suitable packing between the bull ring and balance ring, all combined substantially as described.

In testimony whereof I affix my signature in presence of two witnesses.

FRANK P. MALONE.

Witnesses:
M. E. MALONE,
M. J. KEARNEY.